(12) United States Patent
Bisbee et al.

(10) Patent No.: US 10,496,172 B2
(45) Date of Patent: Dec. 3, 2019

(54) METHOD AND APPARATUS FOR HAPTIC FEEDBACK

(71) Applicant: QUALCOMM Incorporated, San Diego, CA (US)

(72) Inventors: Mark Bisbee, Los Gatos, CA (US); Kevin Johnson, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/717,442

(22) Filed: Sep. 27, 2017

(65) Prior Publication Data

US 2019/0094967 A1   Mar. 28, 2019

(51) Int. Cl.
*G06F 3/01* (2006.01)
*G06F 3/041* (2006.01)

(52) U.S. Cl.
CPC .......... *G06F 3/016* (2013.01); *G06F 3/041* (2013.01); *G06F 3/0414* (2013.01); *G06F 3/0416* (2013.01); *G06F 2203/04105* (2013.01)

(58) Field of Classification Search
USPC ..................................... 345/170–176, 690
See application file for complete search history.

(56) References Cited

U.S. PATENT DOCUMENTS

| | | | | |
|---|---|---|---|---|
| 2002/0033795 | A1* | 3/2002 | Shahoian | G06F 1/1616 |
| | | | | 345/156 |
| 2007/0091063 | A1* | 4/2007 | Nakamura | G06F 3/016 |
| | | | | 345/156 |
| 2015/0005039 | A1* | 1/2015 | Liu | H04M 1/72569 |
| | | | | 455/567 |
| 2016/0004408 | A1* | 1/2016 | Yun | G06F 3/04883 |
| | | | | 345/173 |
| 2016/0162031 | A1* | 6/2016 | Westerman | G06F 3/016 |
| | | | | 345/173 |
| 2016/0241119 | A1* | 8/2016 | Keeler | H02K 35/02 |
| 2017/0003789 | A1* | 1/2017 | Woolley | G06F 3/016 |
| 2017/0010847 | A1* | 1/2017 | Bernstein | G06F 1/165 |
| 2017/0011210 | A1* | 1/2017 | Cheong | A61B 5/0022 |
| 2017/0168578 | A1* | 6/2017 | Tsukamoto | G06F 3/016 |
| 2017/0228028 | A1* | 8/2017 | Nakamura | G06F 3/017 |
| 2018/0154519 | A1* | 6/2018 | Lin | B25J 9/163 |
| 2018/0188872 | A1* | 7/2018 | Zhu | G06F 3/0414 |

* cited by examiner

*Primary Examiner* — Tony O Davis
(74) *Attorney, Agent, or Firm* — QUALCOMM Incorporated (57) ABSTRACT

Methods and apparatuses for providing haptic feedback are disclosed. An apparatus may include one or more processors and a touch sensor coupled to the one or more processors for sensing a user input. The apparatus may also contain a haptic feedback system and a force sensor coupled to the haptic feedback system for measuring a force of the user input. The haptic feedback system may provide a haptic effect based at least in part upon the force of the user input and a configuration of the haptic feedback system, and the one or more processors may change the configuration of the haptic feedback system based upon an application being executed, or a user-selected configuration, or a power mode, or a combination of the aforementioned.

27 Claims, 8 Drawing Sheets

METHOD AND APPARATUS FOR HAPTIC FEEDBACK

TECHNICAL FIELD

This disclosure relates generally to haptic feedback systems and methods for operating such systems. The present disclosure more specifically relates to haptic feedback based on the measurement of a touch and/or a force of a touch.

BACKGROUND

Mobile devices have included various types actuators to provide haptic feedback to a user. Haptic feedback is a method of providing a tactile response, through vibrations or other stimulation, to a user. Haptic feedback is helpful to a user because it can provide a simulation of a tactile sensation that emulates the response of an object represented in the user interface. Haptic feedback can also provide an indication to a user that an element has been selected, or a button has been pressed, a knob has been turned, or a slider has been moved, among other things, when the user is interfacing with a touch screen.

In devices with touchscreens, such touchscreens usually only sense the two-dimensional (x,y) location that is touched. A haptic feedback system that takes input from a two-dimensional touchscreen can provide a haptic feedback reaction to a touch in that location, but without a measurement of the z-axis force the haptic feedback system is not able to accurately emulate a response of an object represented in the user interface.

Some devices incorporate force sensors to measure the force of a touch on a screen. However, one problem with these devices is that the delay between the measurement of force and the actuation of haptic feedback is too long to provide an accurate emulation of the response of an object represented in the user interface.

Another problem is that the delay appears to the user to be a lag in the response of the user interface. For example, when typing quickly on a keyboard, lag in the haptic feedback of keypresses becomes readily apparent to a user.

Furthermore, where conventional devices simultaneously measure a location and force of a user input, a conventional processor cannot provide a custom haptic effect for that particular location or force level without the aforementioned lag.

A need therefore exists for a haptic feedback system that provides a haptic feedback response with a lower delay than conventional systems.

SUMMARY

The systems, methods and devices of the disclosure each have several innovative aspects, some or all of which can be implemented in various implementations and/or configurations as described herein.

One innovative aspect of the subject matter described in this disclosure may be implemented in an apparatus. The apparatus may include a processor and a touch sensor coupled to the processor capable of sensing a user input, a haptic feedback system, a force sensor coupled to the haptic feedback system that measures a force of a user input and provides an input value to the haptic feedback system, where the processor can change a configuration based at least in part upon an application being executed, or a user-selected configuration, or a power mode, wherein the configuration may comprise one or more configuration settings of the haptic feedback system, and the haptic feedback system can provide a haptic effect based upon an input value to the haptic feedback system and on the configuration.

In some aspects, a method for providing a haptic effect to a user may comprise sensing by a touch sensor a user input, sensing by a force sensor a force of a user input wherein the force sensor provides an input value to a haptic feedback system; providing, by the haptic feedback system the haptic effect based at least in part on the input value to the haptic feedback system and on a configuration which may comprise one or more current configuration settings; and changing, by a processor, a configuration of the haptic feedback system based at least in part on an application being executed, or a user selected configuration, or a power mode, or any combination thereof.

In some aspects, a non-transitory computer readable medium may have software stored thereon including instructions that when executed by a processor cause a device to sense, by a touch sensor, a user input; sense, by a force sensor, a force of the user input; provide, via the force sensor, an input to a haptic feedback system; provide, by the haptic feedback system, a haptic effect based at least in part on the input to the haptic feedback system and on a configuration which may comprise one or more configuration settings; and change, by the processor, a configuration of the haptic feedback system based at least in part upon an application being executed, or a user selected configuration, or a power mode, or any combination thereof.

In some aspects a device that provides haptic effects to a user may comprise means for processing; means for sensing a user input, coupled to a processor; means for sensing force coupled to haptic feedback means, the means for sensing force configured to sense a force of the user input and provide an input to the haptic feedback means, wherein the input to the haptic feedback means may comprise a value proportional to the force of the user input; the haptic feedback means configured to provide the haptic effect to the user based at least in part on the input to the haptic feedback means; and means for changing a configuration of the haptic feedback means based at least in part upon an application being executed, or a user-selected configuration, or a power mode, or any combination thereof.

The force sensor, touch sensor, and/or processor may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof.

The force sensor and touch sensor may be integrated into a single sensor capable of sensing both force and touch, and simultaneously or substantially simultaneously measuring both force and location of a touch.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

Like references and designations in the various drawings indicate like elements.

DETAILED DESCRIPTION

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a biometric system as disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands, patches, etc., Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, automatic teller machines (ATMs), parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, automobile doors, steering wheels or other automobile parts, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Herein, a user input may be described as any one of a touch, a press, a sliding motion, a tap, or a multi-finger gesture, and such descriptive labels may be used interchangeably to describe a user input.

A touch sensor may be, for example, any type of device that senses touch by any means, such as by sensing a capacitive field, an electric field, optical means.

A haptic actuator may be, for example, any type of device that causes a cutaneous, kinesthetic, or haptic perception, by any means such as electrostatic, ultrasonic, or vibration. Examples of such devices are linear resonant actuators, vibratory motors, ultrasonic emitters, and electrostatic glass surfaces.

Figure 1A:
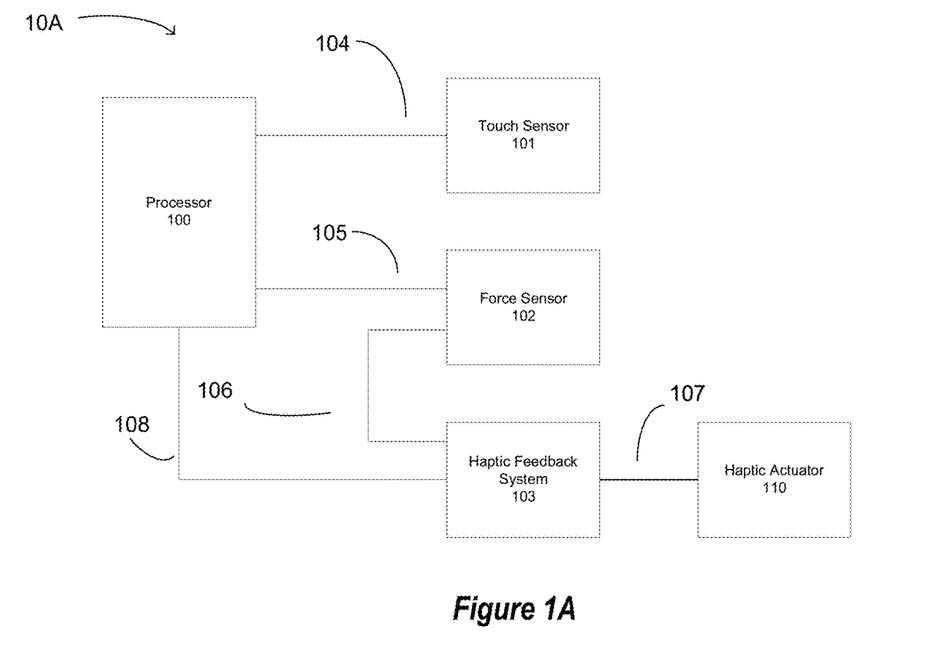
FIG. 1A shows a block diagram representation of components of an example apparatus 10A for providing a haptic effect according to some implementations.

FIG. 1A generally illustrates a block diagram representation of components of an example apparatus 10A for providing a haptic effect, according to some implementations. In some aspects, an apparatus may include a processor 100, a force sensor 102 coupled to the processor 100 via a bus 104, a haptic feedback system 103 coupled to the processor 100 via a bus 108, the haptic feedback system 103 also coupled via a bus 106 to the force sensor 102, and a touch sensor 101 coupled to the processor 100, wherein the touch sensor 101 is configured to sense a location of a touch and the force sensor 102 is configured to sense a force of a touch. The processor 100 may be configured to, among other things, to process input from the touch sensor 101 and the force sensor 102, and to change a configuration of the haptic feedback system 103. The processor 100 may be a DSP, a general purpose processor such as an applications processor, a processor dedicated to processing sensor data, or may be a dedicated circuit for the purposes of processing data related to user input and haptic feedback.

The processor 100 may be configured to receive data related to the touch sensor 101 via a bus 104. The data from the touch sensor 101 provided via the bus 104 may be processed by the processor 100 for the purposes of allowing a user to interact with the user-interface on a device. A force sensor 102 may be coupled via a bus 105 to the processor 100 in order for the force sensor 102 to provide a force measurement to the processor 100. The force sensor 102 may output a force of a user input as an input to the haptic feedback system 103. The processor 100 may also be coupled to the haptic feedback system 103 in order to change a configuration of the haptic feedback system 103.

The force sensor 102 may be capable of sensing any of a force or a pressure by any means, such as by detecting a change in a measurable physical quantity, such as resistance, capacitance, inductance, stress, or strain, etc. of an element. The force sensor 102 may also sense force by other means such as by detecting a distortion in the path of a light beam, or by measuring a voltage or heat output such as by piezoelectric or pyroelectric elements. The force sensor 102 also may directly output a signal indicative of force or pressure.

The input to the haptic feedback system 103 may be proportional (or inversely proportional) or otherwise representative of a force of the user input. This input may be provided by the force sensor 102 via bus 106 as a digital or an analog signal, either as the output of processing circuitry in force sensor 102 or as a measurable physical quantity inherent in the nature of the force sensor 102 element itself, such as when the force sensor 102 is a resistive force sensor that outputs a resistance proportional to the measured force, or as when the force sensor 102 is a piezoelectric force sensor that outputs a voltage proportional to the measured force. Other types of sensors may similarly provide a measurable change in a physical quantity.

The haptic feedback system 103 may be configured to provide a haptic effect via the bus 107, to one or more haptic actuators 110, based on the input to the haptic feedback system 103. The haptic feedback system 103 may have a configuration, which may be a default configuration or may be modifiable by the processor 100. The haptic feedback system 103 may be further configured to provide a haptic effect based upon a location of a user input provided to the haptic feedback system 103.

Such a configuration may be based upon an application being executed on the processor 100. For example, the configuration may cause the haptic feedback system 103 provide a first type of haptic feedback when a user is interacting with the user interface of a first application on the processor 100, and a second type of haptic feedback when a user is interacting with the user interface of a second application on the processor 100. Furthermore, the configuration may cause the haptic feedback system 103 to provide one set of haptic feedback effects when a user is interacting with the user interface of a first application on the processor 100, and a second set of haptic feedback effects when a user is interacting with the user interface of a second application on the processor 100.

Such a configuration may be based upon a user selected configuration. For example, a user may select a first configuration, whereby the first selected configuration may cause the haptic feedback system 103 to provide one type of haptic feedback when a user is interacting with a device, and a second type of haptic feedback when a user selects a second configuration. Furthermore, the configuration may cause the haptic feedback system 103 to provide one set of haptic feedback effects when a user selects a first configuration, and a second set of haptic feedback effects when a user selects a second configuration.

Such a configuration may be based upon a power mode of a device. For example, when a device is in a lower-power mode, the configuration may cause the haptic feedback system 103 to provide a haptic effect that consumes less power as compared to an alternative haptic effect; the configuration may alternatively cause the haptic feedback system 103 to select a haptic effect actuator that consumes less power than an alternative. For example, when a device is in a higher-power mode, the configuration may cause the haptic feedback system 103 to provide a haptic effect that consumes more power as compared to an alternative haptic effect; the configuration may alternatively cause the haptic feedback system 103 to select a haptic effect actuator that consumes more power than an alternative.

Such a configuration may also be based upon a power mode of one or more components within a device, such as power mode of the haptic feedback system 103, where the haptic feedback system 103 may be configured to operate in a lower or higher power mode.

Figure 1B:
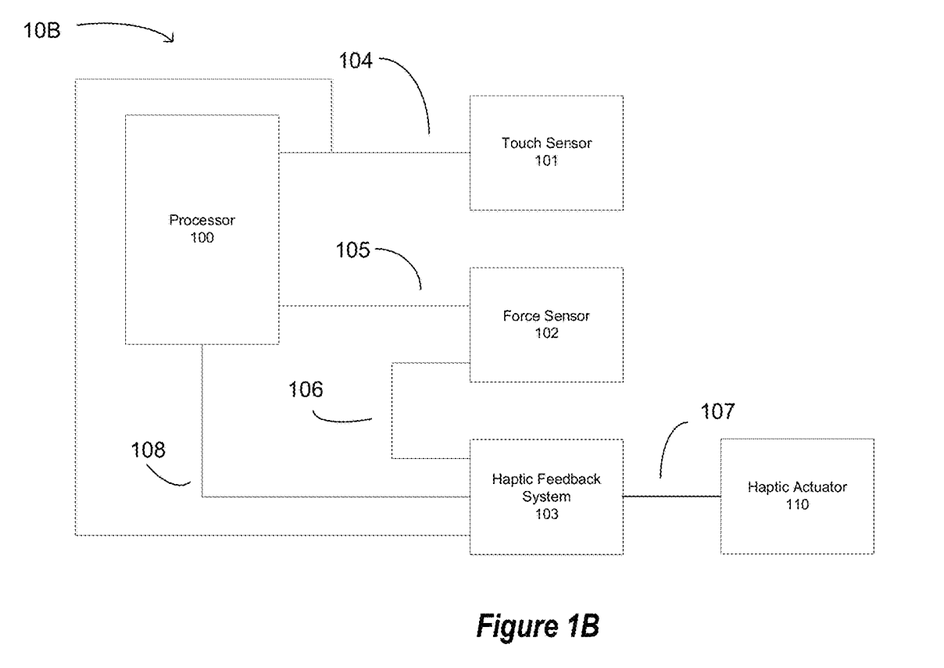
FIG. 1B shows a block diagram representation of components of an example apparatus 10B, showing a connection between a touch sensor, a processor, and a haptic feedback system, for providing a haptic effect according to some implementations.

FIG. 1B generally illustrates a block diagram representation of components of an example apparatus 10B for providing a haptic effect, according to some implementations.

As shown in FIG. 1B, the bus 104 may be additionally connected to the haptic feedback system 103 in order for the haptic feedback system 103 to take into account the location of a user input for the purposes of providing haptic feedback. The location of a user input may alternatively be routed through the processor 100 to the haptic feedback system 103. The location of the user input may be used in conjunction with aspects of the configuration of the haptic feedback system 103. For example, the haptic feedback system 103 may be configured to provide a first haptic feedback effect based upon a first user input at a first location, and to provide a second haptic feedback effect based upon a second user input at a second location.

In another aspect, the force sensor 102 may provide the haptic feedback system 103 with a location of a user input, in conjunction with, or independent of, the touch sensor 101 providing a location of a user input.

In some implementations, the haptic feedback system 103 may be configured to modify characteristics of a haptic effect, or to provide a haptic effect with different or distinct characteristics from another haptic effect, such characteristics being an amplitude or strength, a duration, a beat pattern, a frequency, or any combination thereof. The haptic feedback system 103 may also be configured to modify characteristics of a haptic effect, or to provide a haptic effect with different or distinct characteristics from another haptic effect, by selecting a particular haptic actuator 110 from a plurality of haptic actuators 110. The haptic feedback system 103 may also be configured to modify characteristics of a haptic effect, or to provide a haptic effect with different or distinct characteristics from another haptic effect, by selecting a set of haptic actuators 110 from a plurality of haptic actuators 110.

In some implementations, the haptic feedback system 103 may comprise a plurality of force thresholds. Each force threshold may have an associated haptic feedback effect and/or a change in one or more haptic feedback effect characteristics associated with a transition of a force of a user input across a threshold.

Figure 1C:
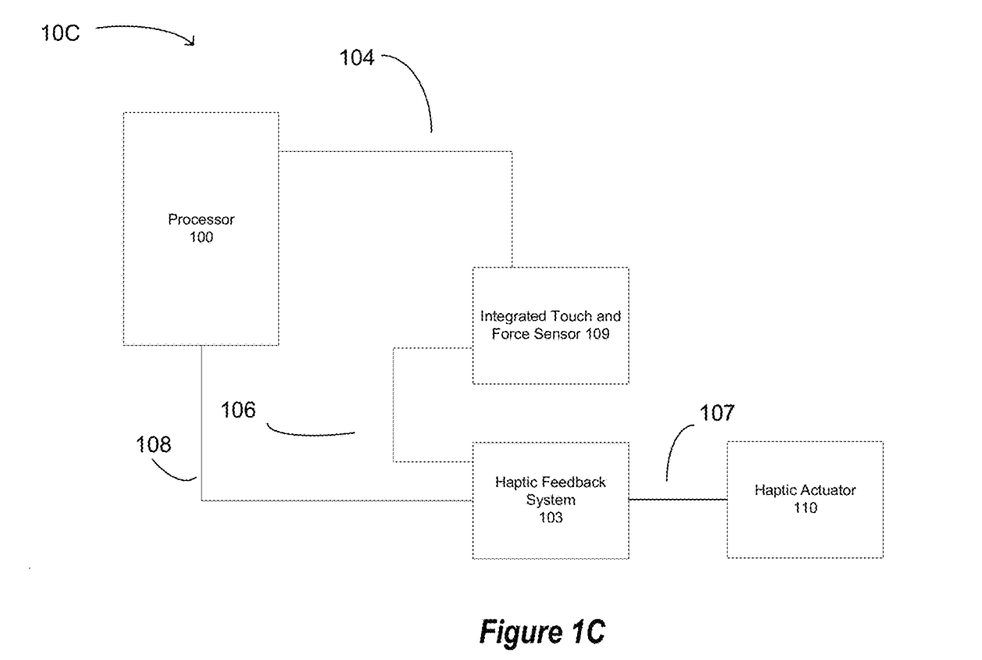
FIG. 1C shows a block diagram representation of components of an example apparatus 10C for providing a haptic effect using an integrated touch and force sensor, showing a connection between the integrated touch sensor, a processor, and a haptic feedback system, according to some implementations.

FIG. 1C generally illustrates a block diagram representation of components of an example apparatus for providing a haptic effect, wherein there is an integrated touch and force sensor 109 in place of separate touch and force sensors.

FIG. 1C generally illustrates a block diagram representation of components of an example apparatus 10C for providing a haptic effect, according to some implementations.

In some devices for providing haptic effects, it may be advantageous to have an integrated touch and force sensor 109, such as shown in FIG. 1C, that provides a location of a user input and an associated force of a user input. An integrated touch and force sensor 109 may sense both force and touch substantially simultaneously using one or more measurements of the same physical quantity of an associated sensing element, such as by measuring a change in resistance of one or more sensing elements. An integrated touch and force sensor 109 may sense both force and touch substantially simultaneously using one or more measurements of different physical quantities, such as by measuring a change in resistance and a change in capacitance of one or more sensing elements. An integrated touch and force sensor 109 may infer a force measurement based upon a proxy for force, such as a surface area of a finger on a touchscreen.

The input to the haptic feedback system 103 provided by the integrated touch and force sensor 109 via bus 106 may comprise a location of a user input and a signal associated with a force of a user input, wherein the signal associated with a force of a user input may be proportional (or inversely proportional) or otherwise representative of a force of the user input. This input may be provided by the integrated touch and force sensor 109 via bus 106 as a digital or an analog signal, either as the output of processing circuitry in the integrated touch and force sensor 109 or as a measurable physical quantity inherent in the nature of the integrated touch and force sensor 109 element itself, such as when the integrated touch and force sensor 109 is a resistive touch and force sensor that changes one or more resistances proportional to a location of a user input and an associated force. Other types of sensors may similarly provide a measurable change in a physical quantity.

Figure 1D:
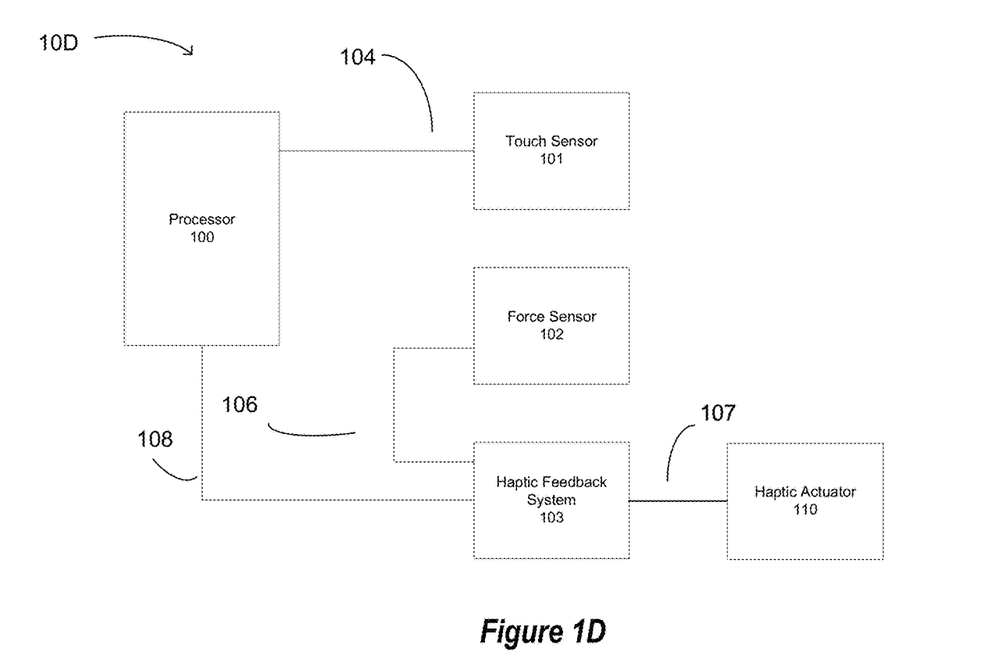
FIG. 1D shows a block diagram representation of components of an example apparatus 10D for providing haptic feedback, according to some implementations.

FIG. 1D generally illustrates a block diagram representation of components of an example apparatus 10D for providing a haptic effect, according to some implementations.

As shown in FIG. 1D, in some implementations, the force sensor 102 may not be coupled to the processor 100. The force sensor 102 may only provide a force of a user input to the haptic feedback system 103 without providing said force to the processor 100. The force sensor 102 may also provide a location, or a rough location estimate, based upon a set of force sensors arranged such as to provide a location or a rough location estimate, to the haptic feedback system 103.

Figure 2A:
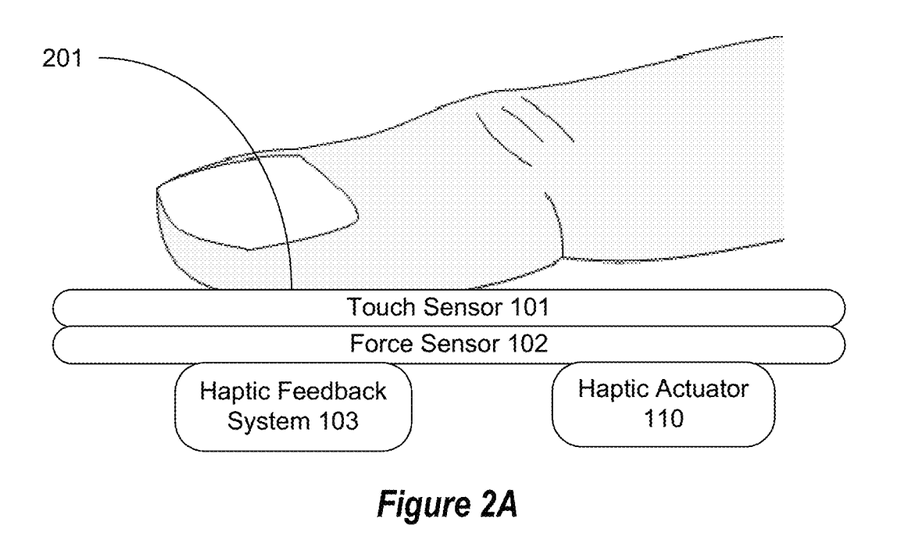
FIG. 2A shows a representation of an example user interaction where a finger touches a device with separate force and touch sensors, according to some implementations.

As shown in FIG. 2A, a user input at point 201 may be measured by a touch sensor 101 as a two-dimensional (x,y) location. The force of a user input at point 201 may be measured by a separate force sensor 102 as a z-axis force.

Figure 2B:
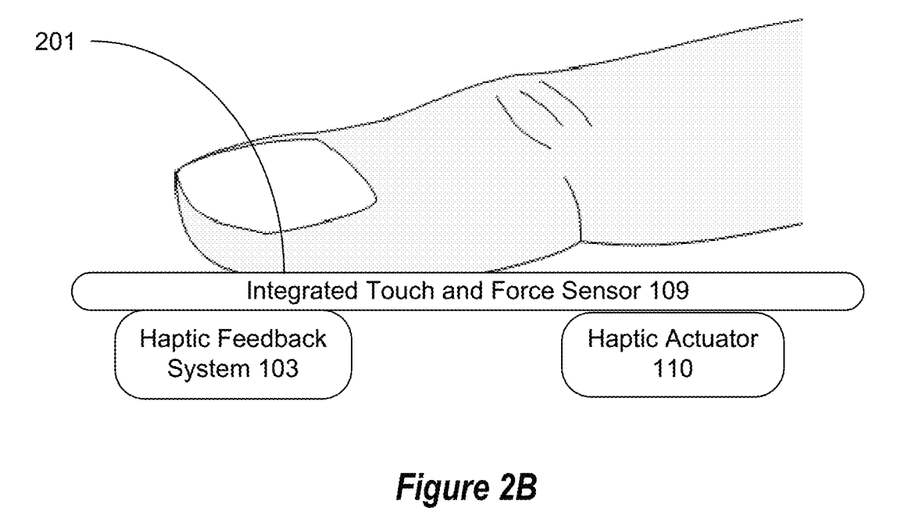
FIG. 2B shows a representation of an example user interaction where a finger touches a device with an integrated touch and force sensor, according to some implementations.

As shown in FIG. 2B, a user input at point 201 may be measured by an integrated touch and force sensor 109 substantially simultaneously as a two-dimensional (x,y) location and a z-axis force.

Figure 3:
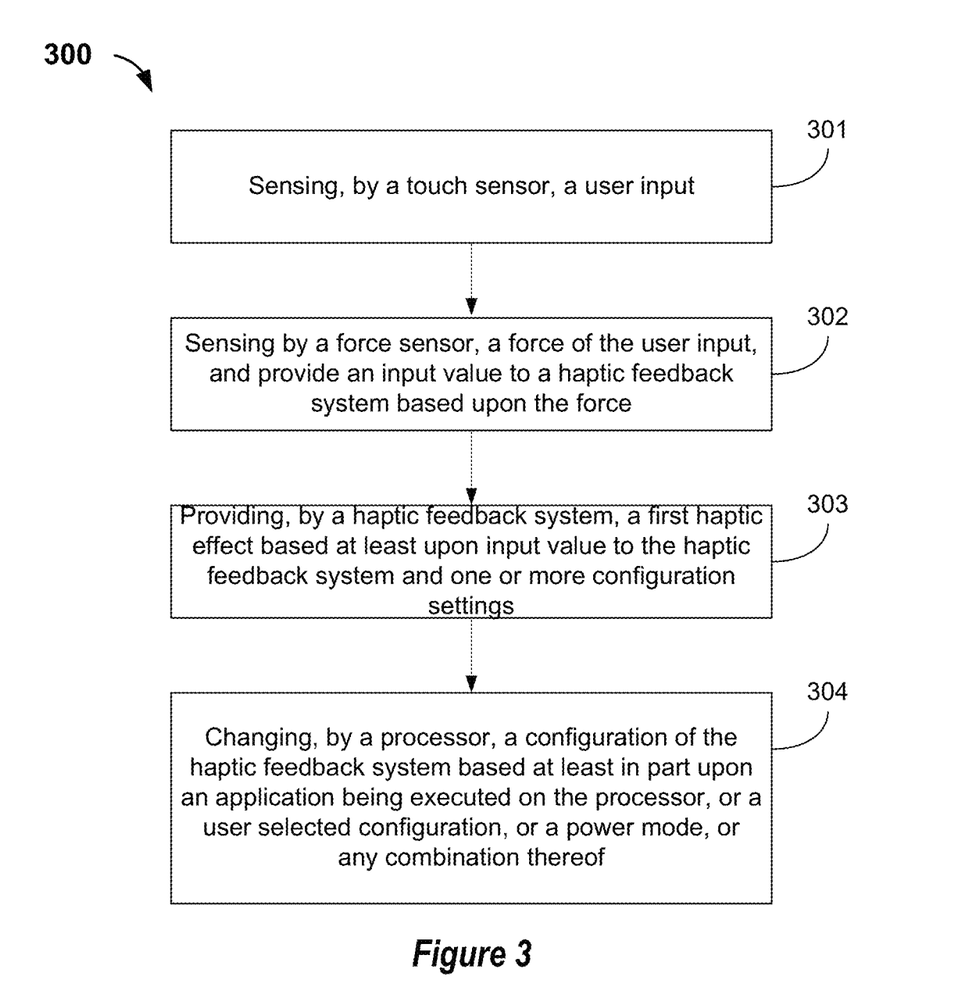
FIG. 3 shows a flowchart diagram of example method of providing a haptic feedback effect to a user, according to some implementations.

FIG. 3 generally illustrates a method 300 for providing a haptic effect by an apparatus described herein, for example, that in FIG. 1A.

At 301, a touch sensor 101 senses a location of a user input. At 302 a force sensor senses a force of the user input and provides a value or a signal proportional to said force to the haptic feedback system 103. At 303, the haptic feedback system 103 provides a haptic effect based upon the input to the haptic feedback system 103. At 304, the processor changes a configuration of the haptic feedback system 103 based at least in part upon an application being executed on the processor, or a user selected configuration, or a power mode, or any combination thereof.

Figure 4:
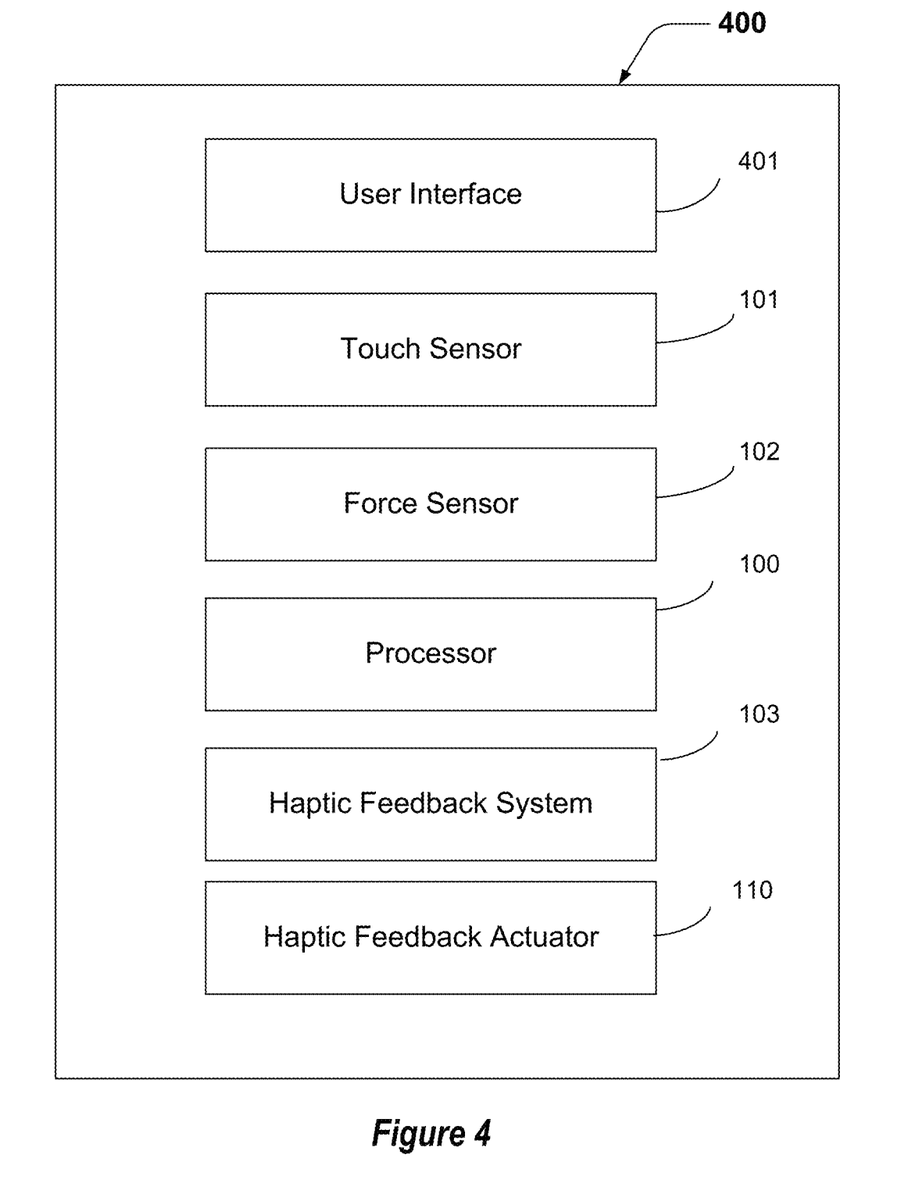
FIG. 4 shows a high-level component diagram of an apparatus that provides a haptic feedback effect to a user, according to some implementations.

FIG. 4 generally illustrates a block component diagram showing the components of a system for providing a haptic effect.

Such a system as in FIG. 4 may have a touch sensor 101 and a force sensor 102 for sensing a location of a user input and a force of a user input, respectively. Such a system may comprise a user interface 401 with which a user may interact. A user interface 401 may be, for example, the user interface of a smartphone, computer, or smartwatch. The user interface 401 may allow a user to change a configuration of a haptic feedback system 103 by a user inputting the appropriate commands. The haptic actuator 110 may be, for example, any type of device that causes a cutaneous, kinesthetic, or haptic perception, by any means such as electrostatic, ultrasonic, or vibration. Further examples of such devices are linear resonant actuators, vibratory motors, ultrasonic emitters, and electrostatic glass surfaces.

Figure 5:
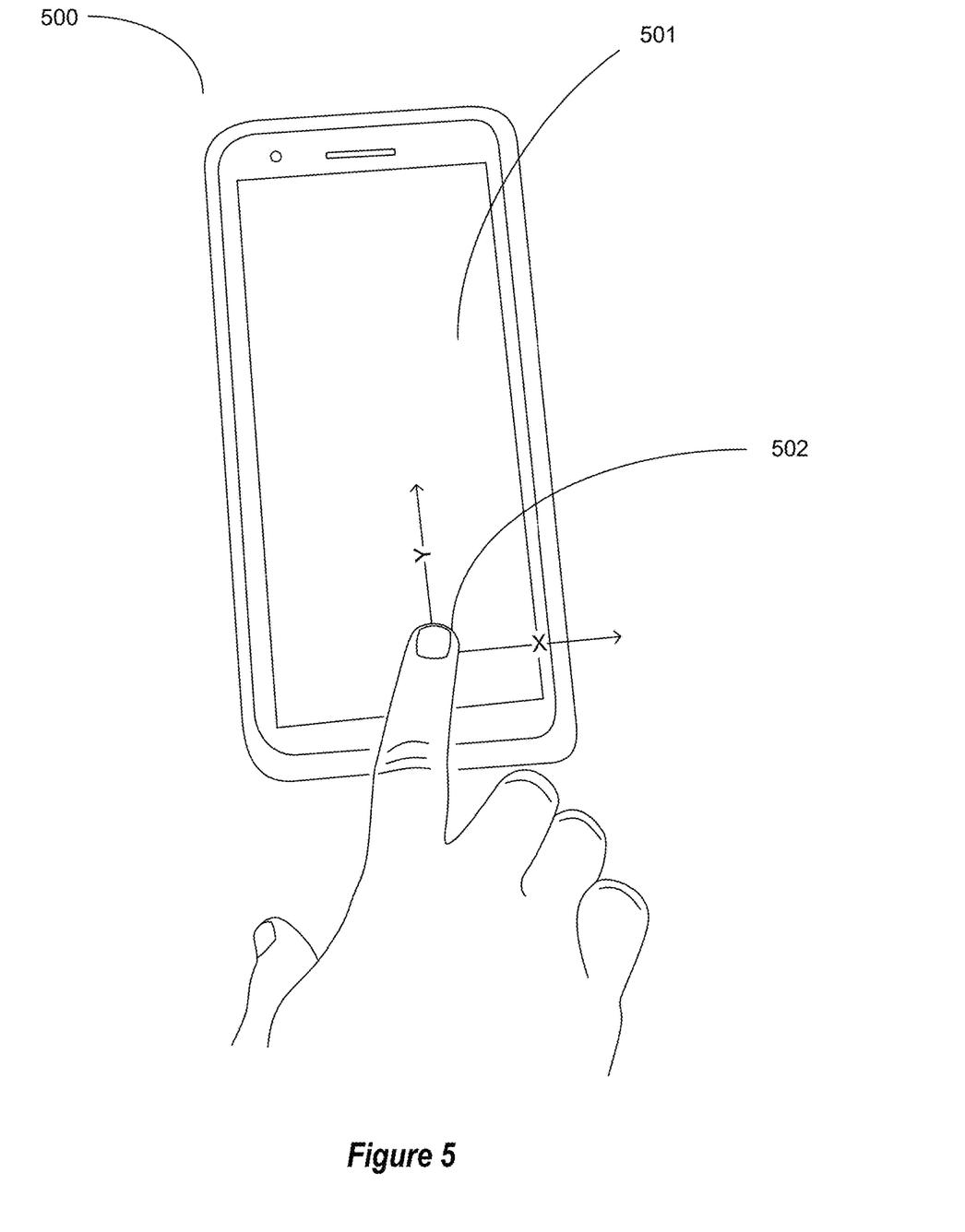
FIG. 5 shows a representation of a device with a touch sensor that measures two-dimensional (x,y) data, according to some implementations.

FIG. 5 generally illustrates a diagram of a user interacting with an apparatus for providing a haptic effect 500. A user provides a touch to touchscreen 501 which senses a location of a user input 502. The touchscreen 501 provides at least two-dimensional x and y coordinates, but may also provide a z-axis force measurement, or a pseudo-z-axis force measurement based upon a measurement used as a proxy for force, such as an area of touch. For example, an area of touch may be used as a proxy for force due to the distortion of the fleshy part of a finger as it presses a touchscreen with increasing force.

Figure 6A:
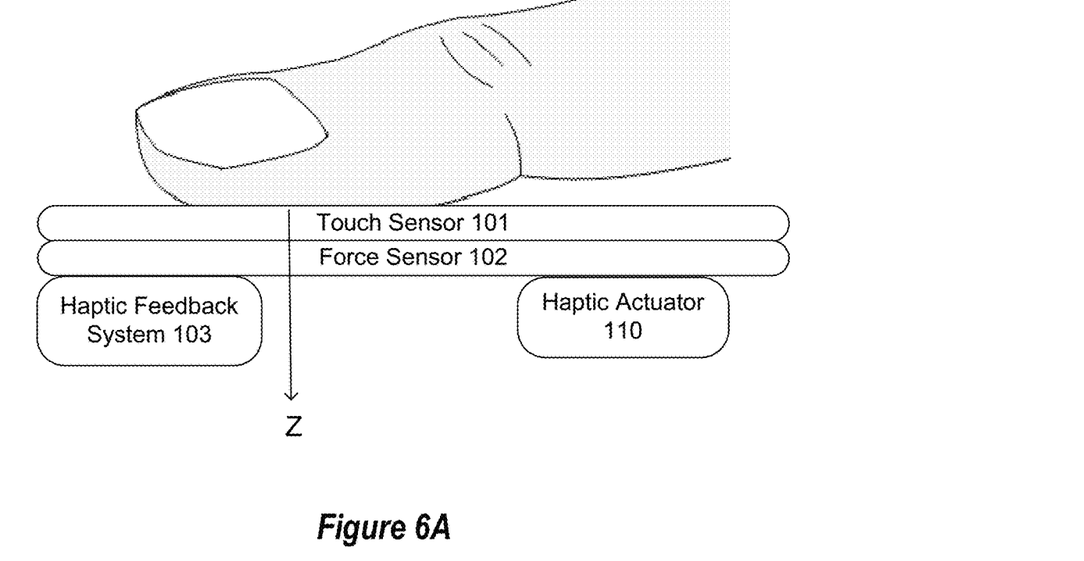
FIG. 6A shows a representation of a finger touching or pressing a device where the force sensor is configured to measure a z-axis force, according to some implementations.

FIG. 6A generally illustrates a user input comprising a z-axis force applied to a device. In some implementations, a haptic feedback system 103 may be configured to provide a haptic feedback effect via a haptic actuator 110 by taking into account only the z-axis force applied to a device. This may be used in some use cases where, for example, a device is being used under conditions where the touchscreen may not be able, or necessary, to determine an input. Examples of such cases may be to allow touch support underwater or while the screen is wet, to allow for a user to enter a touch while wearing gloves, to account for force on a fingerprint sensor, to determine a squeeze or firm press, or to enable an analogue to a hardware front button.

Figure 6B:
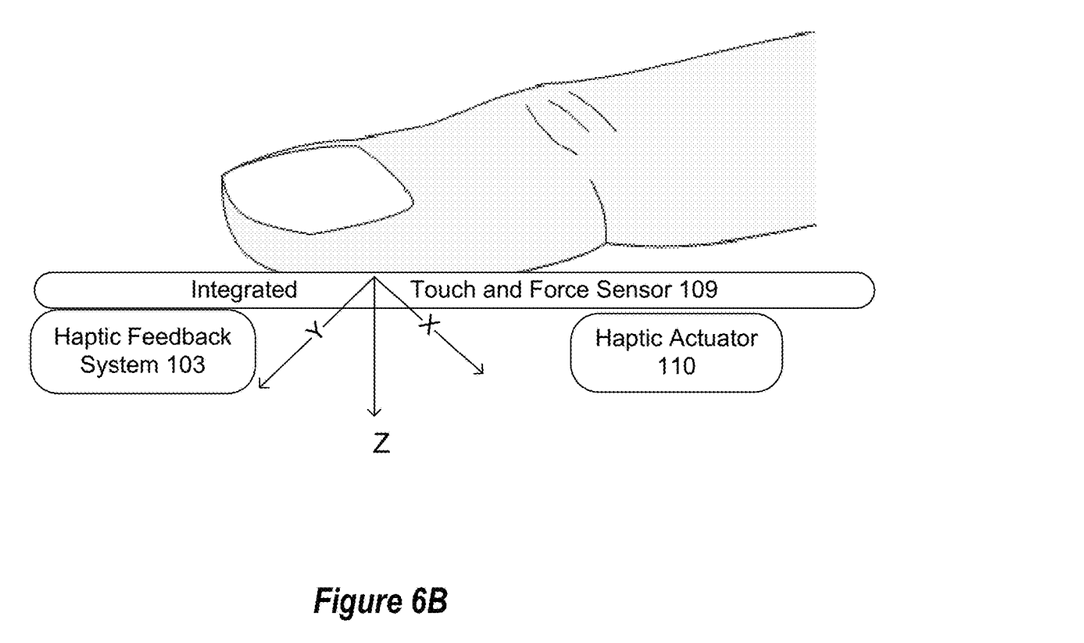
FIG. 6B shows a representation of a finger touching or pressing a device where the force sensor is configured to measure a z-axis force, according to some implementations.

FIG. 6B generally illustrates a user input comprising a two-dimensional (x,y) location substantially simultaneously with a z-axis force as measured by an integrated touch and force sensor 109. In general, in a system that does not have a force sensor directly connected to a haptic feedback system, the delay in a haptic feedback response may take 40-150 milliseconds longer than a system that provides output from the force sensor directly to the haptic feedback system, depending on the time delay of the processing loop. A system that provides output from a force sensor to a haptic feedback system may provide sub-20 millisecond haptic response. A system that further integrates a touch sensor with a force sensor may reduce that response time even further, by sensing touch and force together at the same time in order to provide a haptic response immediately after, and only after, a sensed touch.

Figure 7:
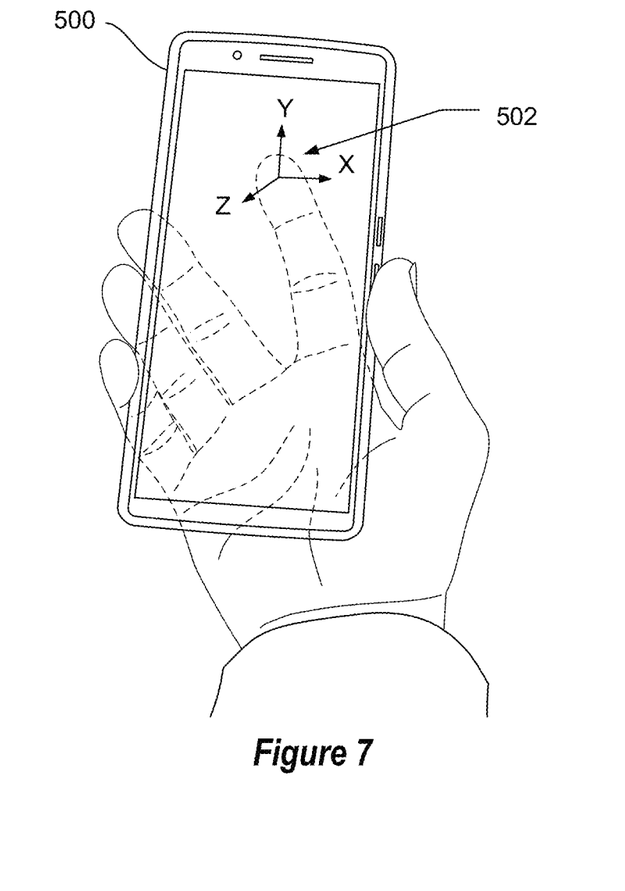
FIG. 7 shows a representation of a finger touching or pressing a device where the force sensor and/or touch sensor are configured to measure aspects of a user input, according to some implementations.

FIG. 7 generally illustrates an example implementation where a user provides a user input to the back of a device. Such an implementation may, for example, enable a device to measure a squeeze, a grip, or a firm press on the sides or back of a device, or to enable dynamic buttons on the back or side. In such implementations, a device may have an array of force sensors with which to sense a user input and a location of a user input based upon the measurements of individual force sensors.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" or "example" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

What is claimed is:

1. An apparatus for providing a haptic effect, the apparatus comprising:
   one or more processors;
   a touch sensor coupled to the one or more processors and configured to sense a user input, wherein the user input is on the back of a device;

a force sensor coupled to a haptic feedback system, the force sensor configured to measure a force of the user input and provide an input value to the haptic feedback system;
wherein the haptic feedback system is configured to provide a first haptic effect based at least in part on the input value to the haptic feedback system and one or more current configuration settings; and
wherein the one or more processors is coupled to the haptic feedback system and is configured to change the one or more current configuration settings of the haptic feedback system based at least in part upon a power mode.

2. The apparatus of claim 1, wherein the touch sensor is coupled to the haptic feedback system, and wherein the touch sensor is configured to provide a location of the user input to the haptic feedback system.

3. The apparatus of claim 2, wherein the haptic feedback system is further configured to provide the first haptic effect based at least in part upon the location of the user input.

4. The apparatus of claim 1, wherein the haptic feedback system is further configured to provide, based at least in part upon the input value, a second haptic effect with at least one of an amplitude, or a duration, or a frequency, or any combination thereof different from at least one of an amplitude, or a duration, or a frequency of the first haptic effect, respectively.

5. The apparatus of claim 1, wherein the one or more current configuration settings of the haptic feedback system comprises a plurality of force thresholds.

6. The apparatus of claim 5, wherein the haptic feedback system is further configured to provide the first haptic effect, based at least in part upon a determination that the input value has met or exceeded at least one of the plurality of force thresholds.

7. The apparatus of claim 3, wherein the haptic feedback system is further configured to provide, based at least in part upon the location of the user input, a second haptic effect with at least one of an amplitude, or a duration, or a frequency, or any combination thereof different from at least one of an amplitude, or a duration, or a frequency of the first haptic effect, respectively.

8. A method for providing a haptic effect, the method comprising:
sensing, by a touch sensor, a user input, wherein the user input is on the back of a device;
sensing, by a force sensor, a force of the user input;
providing, by the force sensor, an input value to a haptic feedback system based on the force of the user input;
providing, by the haptic feedback system, a first haptic effect based at least in part on the input value and one or more current configuration settings; and
changing, by a processor, the one or more current configuration settings of the haptic feedback system based at least in part upon a power mode.

9. The method of claim 8, further comprising: providing, by the touch sensor, a location of the user input to the haptic feedback system.

10. The method of claim 9, wherein the first haptic effect is provided by the haptic feedback system based at least in part upon the location of the user input.

11. The method of claim 8, further comprising: providing, based at least in part upon the input value, a second haptic effect with at least one of an amplitude, or a duration, or a frequency, or any combination thereof different from at least one of an amplitude, or a duration, or a frequency of the first haptic effect, respectively.

12. The method of claim 8, further comprising: changing, by the processor, the one or more current configuration settings of the haptic feedback system based at least in part upon a plurality of force thresholds.

13. The method of claim 12, further comprising: providing the first haptic effect, based at least in part upon a determination that the input value meets or exceeds at least one of the plurality of force thresholds.

14. The method of claim 10, further comprising: providing, based at least in part upon the location of the user input, a second haptic effect with at least one of an amplitude, or a duration, or a frequency, or any combination thereof different from at least one of an amplitude, or a duration, or a frequency of the first haptic effect, respectively.

15. A non-transitory computer readable medium, having software stored thereon, the software including instructions that when executed by one or more processors cause a device to perform one or more operations comprising:
sensing, by a touch sensor, a user input, wherein the user input is on the back of a device;
sensing, by a force sensor, a force of the user input;
providing, by the force sensor, an input to a haptic feedback system based on the force of the user input;
providing, by the haptic feedback system, a first haptic effect based at least in part on the input to the haptic feedback system and one or more current configuration settings; and
changing, by the one or more processors, the one or more current configuration settings of the haptic feedback system based at least in part upon a power mode.

16. The non-transitory computer readable medium of claim 15, further including instructions that when executed by the one or more processors cause the touch sensor to perform one or more actions comprising: providing a location of the user input to the haptic feedback system.

17. The non-transitory computer readable medium of claim 16, wherein the first haptic effect is based at least in part upon the location of the user input.

18. The non-transitory computer readable medium of claim 15, further including instructions that when executed by the one or more processors cause the haptic feedback system to perform one or more actions comprising: providing, based at least in part upon the input to the haptic feedback system, a second haptic effect with at least one of an amplitude, or a duration, or a frequency, or any combination thereof different from at least one of an amplitude, or a duration, or a frequency of the first haptic effect, respectively.

19. The non-transitory computer readable medium of claim 15, wherein the one or more current configuration settings of the haptic feedback system comprises a plurality of force thresholds.

20. The non-transitory computer readable medium of claim 19, further including instructions that when executed by the one or more processors cause the haptic feedback system to perform one or more actions comprising: providing the first haptic effect, based at least in part upon a determination that the input to the haptic feedback system has met or exceeded at least one of the plurality of force thresholds.

21. The non-transitory computer readable medium of claim 17, further including instructions that when executed by the one or more processors cause the haptic feedback system to perform one or more actions comprising: providing, based at least in part upon the location of the user input, a second haptic effect with at least one of an amplitude, or a duration, or a frequency, or any combination thereof different from at least one of an amplitude, or a duration, or a frequency of the first haptic effect, respectively.

22. An apparatus for providing a haptic effect, the apparatus comprising:
   means for sensing a user input, wherein the user input is on the back of a device;
   means for sensing a force of the user input;
   means for providing a first haptic effect based at least in part on the force of the user input and one or more current configuration settings;
   means for changing the one or more configuration settings based at least in part upon a power mode.

23. The apparatus of claim 22, wherein means for providing the first haptic effect further comprises means for providing the first haptic effect based at least in part on a location of the user input.

24. The apparatus of claim 22, further comprising means for providing a second haptic effect, based at least in part upon the user input, at least one of an amplitude, or a duration, or a frequency, or any combination thereof, different from an amplitude, or a duration, or a frequency of the first haptic effect, respectively.

25. The apparatus of claim 22, wherein means for providing the first haptic effect further comprises means for providing the first haptic effect based at least in part on a plurality of force thresholds.

26. The apparatus of claim 25, wherein means for providing the first haptic effect further comprises means for providing the first haptic effect based upon whether a force of the user input has met or exceeded at least one of the plurality of force thresholds.

27. The apparatus of claim 23, wherein means for providing the first haptic effect further comprises means for providing the first haptic effect based at least in part upon the location of the user input, at least one of an amplitude, or a duration, or a frequency, or any combination thereof of the first haptic effect.

* * * * *